United States Patent
Aaron et al.

(10) Patent No.: US 8,379,534 B2
(45) Date of Patent: Feb. 19, 2013

(54) DETECTION OF ENCRYPTED PACKET STREAMS USING FEEDBACK PROBING

(75) Inventors: Jeffrey A. Aaron, Atlanta, GA (US); Edgar Vaughan Shrum, Jr., Smyrna, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 342 days.

(21) Appl. No.: 12/779,647

(22) Filed: May 13, 2010

(65) Prior Publication Data

US 2010/0232313 A1 Sep. 16, 2010

Related U.S. Application Data

(63) Continuation of application No. 10/943,591, filed on Sep. 17, 2004, now Pat. No. 7,730,519.

(51) Int. Cl.
*H04L 12/26* (2006.01)
(52) U.S. Cl. .......................................... 370/252
(58) Field of Classification Search ............... None
See application file for complete search history.

(56) References Cited

U.S. PATENT DOCUMENTS

| | | | |
|---|---|---|---|
| 3,646,517 A | 2/1972 | Waters et al. |
| 5,706,406 A | 1/1998 | Pollock |
| 6,522,658 B1 | 2/2003 | Roccanova |
| 6,529,499 B1 | 3/2003 | Doshi et al. |
| 6,640,248 B1 | 10/2003 | Jorgensen |
| 6,651,099 B1 | 11/2003 | Dietz et al. |
| 6,665,725 B1 | 12/2003 | Dietz et al. |
| 6,771,646 B1 | 8/2004 | Sarkissian et al. |
| 6,789,116 B1 | 9/2004 | Sarkissian et al. |
| 6,954,789 B2 | 10/2005 | Dietz et al. |
| 6,961,331 B2 | 11/2005 | Tokunaga et al. |
| 6,973,033 B1 | 12/2005 | Chiu et al. |
| 6,975,592 B1 | 12/2005 | Seddigh et al. |
| 7,010,687 B2 | 3/2006 | Ichimura |
| 7,035,289 B2 | 4/2006 | Devine et al. |
| 7,215,637 B1 | 5/2007 | Ferguson et al. |
| 7,216,230 B2 | 5/2007 | Suzuki et al. |
| 7,246,245 B2 | 7/2007 | Twomey |
| 7,286,667 B1 | 10/2007 | Ryal |
| 7,290,028 B2 | 10/2007 | Brabson et al. |
| 7,299,282 B2 | 11/2007 | Sarkissian et al. |
| 7,359,979 B2 | 4/2008 | Gentle et al. |
| 2001/0023484 A1 | 9/2001 | Ichimura |
| 2002/0027923 A1 | 3/2002 | Tokunaga et al. |
| 2002/0035639 A1 | 3/2002 | Xu |
| 2002/0059170 A1 | 5/2002 | Vange |
| 2002/0075805 A1 | 6/2002 | Gupta et al. |
| 2002/0075875 A1 | 6/2002 | Dravida et al. |
| 2002/0094081 A1 | 7/2002 | Mevinsky |
| 2002/0095577 A1 | 7/2002 | Nakamura et al. |
| 2002/0105911 A1 | 8/2002 | Pruthi et al. |
| 2003/0016770 A1 | 1/2003 | Trans |
| 2003/0021296 A1 | 1/2003 | Wee et al. |
| 2003/0043801 A1 | 3/2003 | Seko |
| 2003/0068040 A1 | 4/2003 | Wee et al. |

(Continued)

*Primary Examiner* — Raj Jain
(74) *Attorney, Agent, or Firm* — Myers Bigel Sibley & Sajovec, P.A.

(57) ABSTRACT

Methods, systems, and devices are disclosed for detecting encrypted Internet Protocol packet streams. A probe stream having a known observable parameter is generated. The observable parameter exhibits a known characteristic of a known type of data encrypted within a stream of packets. The probe stream is communicated to a network element via a communications network. When the probe stream is received by the network element, the network element can compare the known observable parameter to an actual value. Any difference between the known observable parameter and the actual value can be used to correct for network-induced variation and other effects, thus ensuring accurate detection and identification of data types within encrypted streams of packets.

10 Claims, 6 Drawing Sheets

U.S. PATENT DOCUMENTS

| | | |
|---|---|---|
| 2003/0086411 A1 | 5/2003 | Vassilovski |
| 2003/0086515 A1 | 5/2003 | Trans |
| 2003/0093563 A1 | 5/2003 | Young et al. |
| 2003/0097595 A1 | 5/2003 | Partridge et al. |
| 2003/0131228 A1 | 7/2003 | Twomey |
| 2003/0167394 A1 | 9/2003 | Suzuki et al. |
| 2003/0225549 A1* | 12/2003 | Shay et al. .............. 702/182 |
| 2003/0227907 A1 | 12/2003 | Choi et al. |
| 2003/0231767 A1 | 12/2003 | Carbajal |
| 2003/0235209 A1 | 12/2003 | Garg |
| 2004/0003070 A1 | 1/2004 | Fernald et al. |
| 2004/0008724 A1 | 1/2004 | Devine et al. |
| 2004/0057437 A1 | 3/2004 | Daniel et al. |
| 2004/0068668 A1 | 4/2004 | Lor et al. |
| 2004/0071130 A1 | 4/2004 | Doerr et al. |
| 2004/0083299 A1 | 4/2004 | Dietz et al. |
| 2004/0090937 A1 | 5/2004 | Chaskar |
| 2004/0090943 A1 | 5/2004 | daCosta |
| 2004/0090989 A1 | 5/2004 | Kobayashi |
| 2004/0109414 A1 | 6/2004 | Choi et al. |
| 2004/0142697 A1 | 7/2004 | Knaebchen et al. |
| 2004/0199630 A1 | 10/2004 | Sarkissian et al. |
| 2004/0208120 A1 | 10/2004 | Shenoi |
| 2004/0215955 A1 | 10/2004 | Tamai et al. |
| 2004/0234056 A1 | 11/2004 | Heilmann et al. |
| 2004/0258090 A1 | 12/2004 | Sharafeddine et al. |
| 2004/0260829 A1 | 12/2004 | Husak et al. |
| 2005/0052996 A1 | 3/2005 | Houck et al. |
| 2005/0060539 A1 | 3/2005 | Anspach |
| 2005/0060543 A1 | 3/2005 | Anspach |
| 2005/0120208 A1 | 6/2005 | Dobson |
| 2005/0152378 A1 | 7/2005 | Bango et al. |
| 2005/0169253 A1 | 8/2005 | Hu |
| 2006/0031374 A1 | 2/2006 | Lu et al. |
| 2006/0233362 A1 | 10/2006 | Deans et al. |
| 2007/0060166 A1 | 3/2007 | Kitamura et al. |
| 2007/0288630 A1* | 12/2007 | De Noia et al. ............... 709/224 |

* cited by examiner

DETECTION OF ENCRYPTED PACKET STREAMS USING FEEDBACK PROBING

CROSS REFERENCE TO RELATED APPLICATION

This application is a continuation of U.S. patent application Ser. No. 10/943,591, filed Sep. 17, 2004 now U.S. Pat. No. 7,730,519, the disclosure of which is hereby incorporated herein by reference. This application relates to the commonly assigned and concurrently filed United States Applications: Ser. No. 10/944,229, entitled "Detection of Encrypted Packet Streams"; Ser. No. 10/943,588, entitled "Signature Specification for Encrypted Packet Streams"; Ser. No. 10/944,294, entitled "Detection of Encrypted Packet Streams"; Ser. No. 10/943,589, entitled "Detection of Encrypted Packet Streams Using a Timer"; and Ser. No. 10/943,590, entitled "Detection of Encrypted Packet Streams Using Process Variation and/or Multiple Processes". These commonly-assigned applications are all incorporated by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

This application generally relates to communications and, more particularly, to inferring data types in encrypted data streams.

Encryption of communications is increasing. More and more people, businesses, and governments are encrypting their electronic communications. This encryption provides enhanced security and privacy for these electronic communications.

Encryption, however, is a problem for communications service providers. Communications service providers need to know the type of data contained within an electronic communication. Some data types receive priority processing, while other data types are queued for later processing. Encryption, however, hides the contents of the communication and often prevents a communications service provider from determining the level of required processing. Because the communications service provider cannot determine the level of required processing, the encrypted communication defaults to lesser priority and/or processing.

Internet telephony provides an example. Internet telephone calls should be processed to result in a real time, or nearly real time, conversation. If packets are lost, or if packets experience congestion, the quality of the call suffers. Internet telephone calls, then, should receive priority processing. When a communications service provider detects data representing an Internet telephone call, the service provider gives that data priority/special processing to reduce packet loss and to reduce latency effects. Encryption, however, hides the contents of the communication. Encryption prevents the communications service provider from determining whether priority and/or special processing is required. So, even though the communication is an Internet telephone call, encryption causes the communication to default to lesser priority and/or processing. The quality of the call may then suffer from packet loss and congestion.

There is, accordingly, a need in the art for improved determination of data types. When parties encrypt their communications, there is a need for determining the type of data contained inside the encrypted communication. There is also a need for identifying a particular kind of encrypted traffic in order to provide prioritized/specialized processing.

SUMMARY OF THE INVENTION

The aforementioned problems, and other problems, are reduced, according to exemplary embodiments, using methods, computer systems, computer programs, and computer program products that detect the type of data contained within an encrypted stream of packets. According to the exemplary embodiments, the existence of one or more parameters within the encrypted stream of packets is noted. The one or more parameters are observable, despite encryption obscuring the contents of the encrypted stream of packets. Although the parameters are observable, some parameters may be difficult to detect and to measure. Because networks introduce variations and differences into the parameters, the exemplary embodiments help determine the effects of the network. The exemplary embodiments accurately detect, identify, and reduce these network-induced variations and differences. According to the exemplary embodiments, probing streams are sent to determine and to correct for network-caused changes in the observable parameters. These probing streams exhibit known parameter values through the network. The probing streams are measured in a manner such that the difference between the measurements and the known values can be used to correct for network effects, thus ensuring accurate detection and identification of data types encrypted within a stream of packets.

The exemplary embodiments generate a probe stream having a known observable parameter. The known observable parameter exhibits a known characteristic naturally or artificially associated with a known type of data encrypted within streams of packets. The probe stream is then communicated to a network element via a communications network. When the probe stream is received by the network element, the network element compares the known observable parameter to an actual value. Any difference between the known observable parameter and the actual value can be used to correct for network-induced variation and other effects, thus ensuring accurate detection and identification of data types within encrypted streams of packets.

More of the exemplary embodiments receive the probe stream. The known observable parameter within the probe stream is compared to an actual value in the probe stream. The exemplary embodiments then compensate for any variation between the known observable parameter and the actual value when inferring a type of data encrypted within a stream of packets. The variation between the known observable parameter and the actual value is summarized and communicated via the communications network.

Yet more exemplary embodiments describe a system having a communications module that generates a probe stream. The probe stream has a known observable parameter, and the observable parameter exhibits a known characteristic naturally or artificially associated with a known type of data encrypted within streams of packets. The communications module communicates the probe stream to a network element via a communications network.

According to another of the embodiments, a computer program product may be used for detecting data types contained within encrypted packet streams. This computer program product includes computer instructions for generating a probe stream having a known observable parameter, the observable parameter exhibiting a known characteristic naturally or artificially associated with a known type of data encrypted within a stream of packets. The computer program product also includes computer instructions for communicating the probe stream to a network element via a communications network.

The exemplary embodiments may generate probe streams for any type of data. The probe streams may have one or more known observable parameters for any type of video data, voice data (such as Voice Over Internet Protocol data), picture data, text data, and all other types of data. The exemplary embodiments, for example, may be used to generate probe streams exhibiting one or more known characteristics of on-line gaming sessions, simulations, virtual reality, email, messaging, multimedia-conferencing, application-sharing, e-voting, group-ware & collaboration, and any sort or type of video data. The exemplary embodiments can be applied to any encrypted stream which still contains observable parameters having some correlation to the type of data and/or the type of application/service and/or the specific application/service. The concepts described herein can help identify the actual vendor-make, model, and version of a software application being used (e.g., Vendor A may use different packet sizes than Vendor B, and version 3 from Vendor A uses different inter-packet timing than version 1 from Vendor A). Whenever an encrypted stream contains observable parameters, the exemplary embodiments described herein exploit any correlation to the observable parameters.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

These and other features, aspects, and advantages of the embodiments of the present invention are better understood when the following Detailed Description is read with reference to the accompanying drawings, wherein.

DETAILED DESCRIPTION OF EMBODIMENTS

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

According to the exemplary embodiments, the existence of one or more parameters within an encrypted stream of packets is noted. The one or more parameters are observable, despite encryption obscuring the contents of the encrypted stream of packets. Although the parameters are observable, some parameters may be difficult to detect and to measure. Because networks introduce variations and differences into the parameters, the exemplary embodiments help determine the effects of the network. The exemplary embodiments accurately detect, identify, and reduce these network-induced variations and differences. According to the exemplary embodiments, probing streams are sent to determine and to correct for network-caused changes in the observable parameters. These probing streams exhibit known parameter values through the network. The probing streams are measured in a manner such that the difference between the measurements and the known values can be used to correct for network effects, thus ensuring accurate detection and identification of data types encrypted within a stream of packets.

Figure 1:
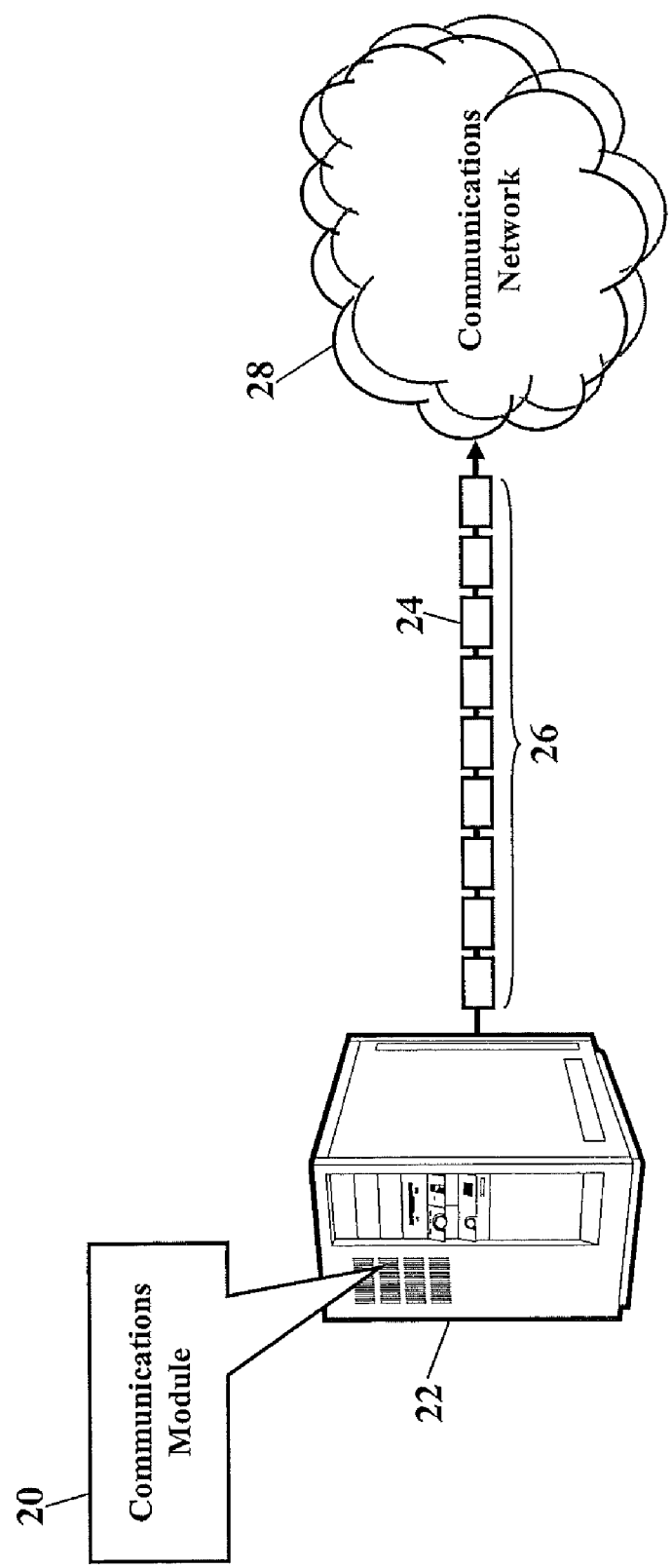
FIG. 1 is a schematic illustrating the exemplary embodiments.

FIG. 1 is a schematic illustrating the exemplary embodiments. A communications module 20 comprises methods, systems, computer programs, and/or computer program products that help provide communications services. The communications module 20 operates within any computer system 22, such as a communications server, a router, a switch, a hub, a gateway, or any other computer system. The communications module 20 generates a probe stream 24. The probe stream 24 has one or more known observable parameters 26. The known observable parameters 26 exhibit known characteristics of known types of data that may be encrypted within streams of packets. The known observable parameters 26, for example, might describe packets sizes, timing intervals, ranges of values, packet patterns, or any other observable characteristics of encrypted data types. Although there are many observable parameters, this patent will not describe in detail the observable parameters 26. If the reader desires to learn more about the observable parameters 26, the reader is invited to consult the commonly assigned and concurrently filed U.S. application Ser. No. 10/944,229, entitled "Detection of Encrypted Packet Streams", incorporated herein by reference.

Once the probe stream 24 is generated, the probe stream 24 is communicated. As FIG. 1 shows, the communications module 20 communications the probe stream 24 via a communications network 28. The communications network 28 may be a cable network operating in the radio-frequency domain and/or the Internet Protocol (IP) domain. The communications network 28, however, may also include a distributed computing network, such as the Internet (sometimes alternatively known as the "World Wide Web"), an intranet, a local-area network (LAN), and/or a wide-area network (WAN). The communications network 28 may include coaxial cables, copper wires, fiber optic lines, and/or hybrid-coaxial lines. The communications network 28 may even include wireless portions utilizing any portion of the electromagnetic spectrum and any signaling standard (such as the various cellular standards CDMA, TDMA, GSM, and/or the I.E.E.E. 802 family of standards).

The probe stream 24 helps compensate for network-induced variations. As packets of data traverse the communications network 28, the communications network 28 introduces variations and/or differences into the observable parameters. That is, as the packets of data travel along the communications network 28, congestion, delay, jitter, data/packet segmentation, data/packet combination or re-combination, and other factors may induce slight changes to the packets. For example, congestion within the communications network 28 may cause intra-packet spacing to compress. Some network operations may append bits to a packet, thus changing the packet bit size. Errant or lost packets can alter packet patterns and/or session timing. Whatever the causes, as the following paragraphs explain, the probe stream 24 helps network elements compensate for these network-induced variations. The probe stream 24 helps network elements determine and compensate for the effects of network-induced variation, such that detection and identification of data types can be accurately accomplished despite network effects.

Figure 2:
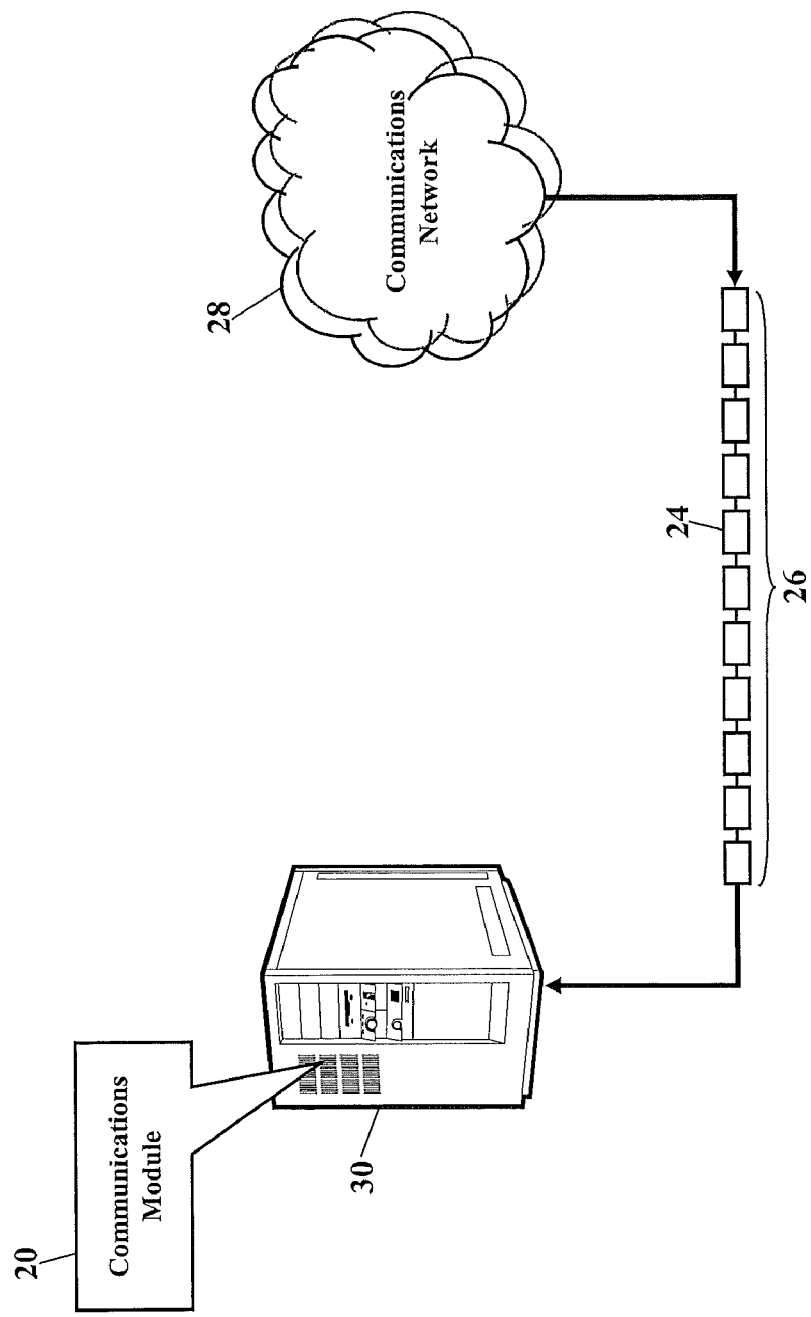
FIG. 2 is a schematic further illustrating the exemplary embodiments.

FIG. 2 is a schematic further illustrating the exemplary embodiments. Here the communications module 20 compensates for network-induced variations. The probe stream 24 is communicated via the communications network 28 and received at a network element 30. The network element 30 can be any device capable of receiving information via the communications network 28. The network element 30 may include any computer system, such as a router, a switch, a hub, a gateway, a proxy, a laptop, a desktop, a tablet, a server, and any other computer system. The network element 30 may also include communications devices, such as a personal digital assistant (PDA), a Global Positioning System (GPS) device, an interactive television, an Internet Protocol (IP) phone, a pager, a cellular/satellite phone, or any computer and/or communications device utilizing a digital signal processor (DSP). The network element 30 may also include addressable watches, radios, vehicles, clocks, printers, gateways, and other apparatuses and systems.

The communications module 20 then analyzes the probe stream 24. The probe stream 24, as earlier described, has the one or more known observable parameters 26. The known observable parameters 26 may be encoded within a packet within the probe stream 24, or the known observable parameters 26 are retrieved from memory. However the known observable parameters 26 are obtained, the communications module 20 compares the known observable parameters 26 to what is actually observed. That is, the communications module 20 measures an actual value of the known observable parameter 26. The communications module 20 measures the actual value of a timing interval, packet size, or any of the other observable parameters. The communications module 20 then compares and corrects for any difference. If, for example, the known observable parameter 26 is a defined timing interval between adjacent packets, the communications module 20 compares the actually-observed timing interval to the defined timing interval described by the known observable parameter 26. If there is a difference between the actually-observed timing interval and the defined timing interval, the difference may be attributed to network-induced variation. The communications module 20 may then choose to compensate for this variation between the known observable parameter 26 and its actual value. That is, the variation is factored into other subsequent streams of packets. The communications module 20 may choose to ignore minute variations, or even gross variations, and, instead, make further comparisons. The communications module 20 may even discard differences exceeding a configurable "sanity-check" difference threshold or difference-rate-of-change threshold. The communications module 20 may also log each observed difference with its date/time of measurement.

Figure 3:
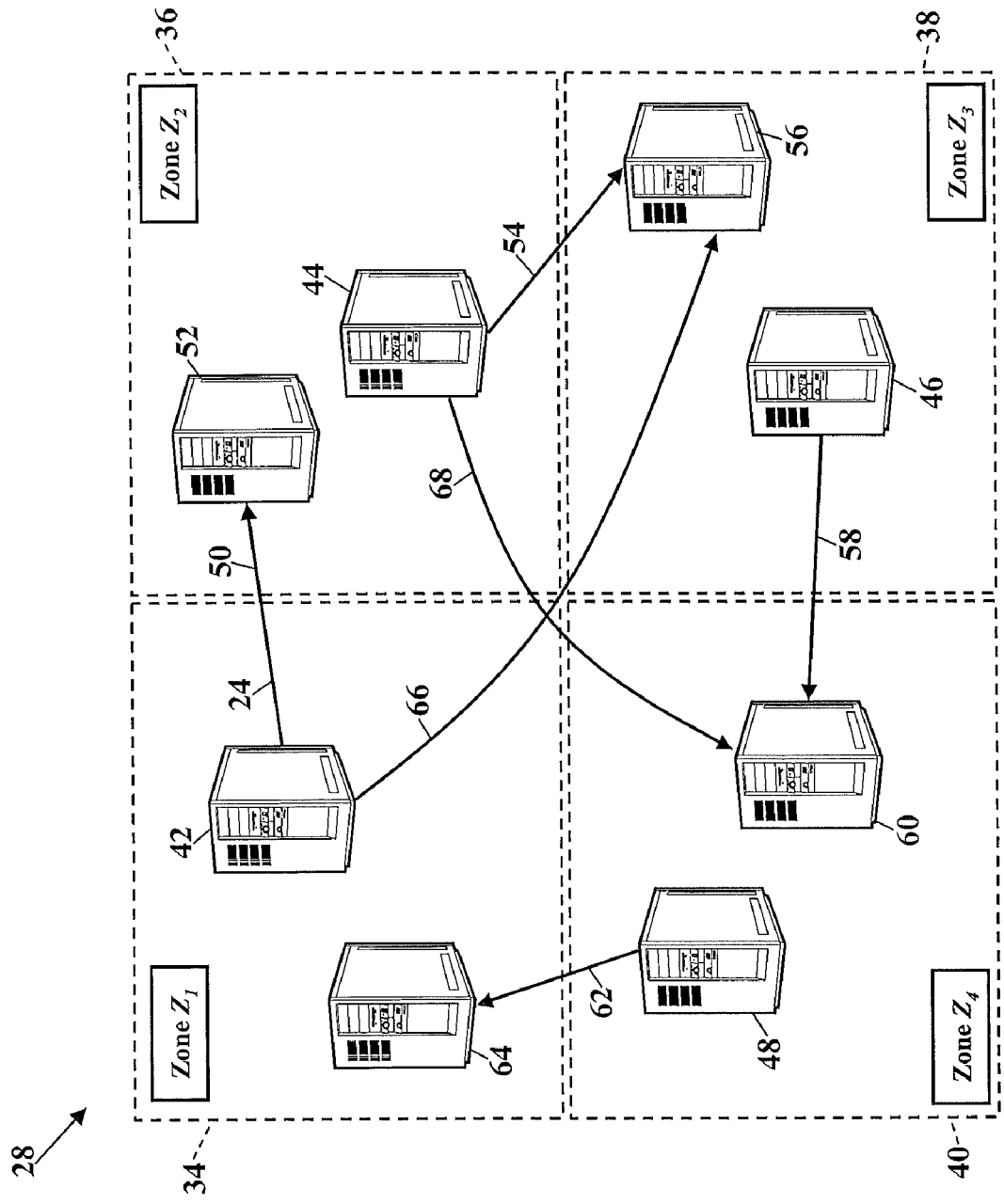
FIG. 3 is a schematic illustrating a zonal communications network, according to more exemplary embodiments.

FIG. 3 is a schematic illustrating more exemplary embodiments. Here the communications network 28 is divided into zones, and a corresponding probe source operates within each zone. In the extreme, each communicating device could be in a unique zone of its own, wherein the probe source could be resident in the device itself. Although the communications network 28 can be divided into any number of zones, FIG. 3, for simplicity, shows zones Z.sub.1, Z.sub.2, Z.sub.3, and Z.sub.4 (shown as respective reference numerals 34, 36, 38, and 40). Each respective probe source 42, 44, 46, and 48 operates within their respective zone 34, 36, 38, and 40. Each probe source sends the probe stream 24 to one or more network elements operating in other zones. That is, the Z.sub.1 probe source 42 sends a probe stream 50 to a network element 52 operating in the second zone 36. The Z.sub.2 probe source 44 sends a probe stream 54 to a network element 56 operating in the third zone 38. The Z.sub.3 probe source 46 sends a probe stream 58 to a network element 60 operating in the fourth zone 40, and the Z.sub.4 probe source 48 sends a probe stream 62 to a network element 64 operating in the first zone 34. The Z.sub.1 probe source 42 also sends a probe stream 66 to the network element 56 operating in the third zone 38, and the Z.sub.2 probe source 44 also sends a probe stream 68 to the network element 60 operating in the fourth zone 40. When each respective network element 52, 56, 60, and 64 receives the respective probe streams, each network element identifies the various probe streams using source and destination addresses. The network elements 52, 56, 60, and 64 then calculate network-induced variations for each received probe stream. When a subsequent stream of packets is received by the network element, and the subsequent stream of packets has a corresponding source and destination zone, the network element applies the same parameter correction as calculated from the corresponding probe stream.

The probe streams may have many characteristics. The probe sources may periodically, randomly, and/or sequentially send their respective probe streams. The probe streams may be encrypted to best match actual encrypted stream detections. The probe streams, however, may comprise cleartext data, where "cleartext" means unencrypted. The probe streams may be generated to exhibit one of many sets of known parameters, wherein each set has an identification number. Each probe stream could then be identified using the identification number. If a particular probe stream is unencrypted, the identification number could be placed in a clear text payload portion of a packet. If a particular probe stream is encrypted, the identification number could be placed in some unencrypted field of a packet header. The identification number of a probe stream may alternately or additionally be periodically displayed via an observable-parameter-coded "identifier" sequence. The identification number could additionally or alternatively act as a pointer, thus allowing the network element to obtain the known parameter value, or a set of parameter values, from memory. However the parameter values are obtained, each network element then calculates the network-induced variations for each received probe stream.

The network elements analyze the probe streams. As each respective network element 52, 56, 60, and 64 receives the respective probe streams, the network element identifies the various probe streams using source and destination addresses. Each network element detects the identification number of the known observable parameters. The network element then obtains the known parameter values corresponding to the identification number. The network element detects and measures the probe stream for the actual values corresponding to each known observable parameter. That is, the network element measures the packet bit size, intra-packet timing interval(s), or whatever characteristic is described by the known observable parameter(s). The network element then compares the actual values to the known observable parameters in the identification set and calculates any difference. The difference may be attributable to network-induced variation or error. The network element may choose to discard differences exceeding a configurable "sanity-check" difference threshold or difference-rate-of-change threshold. The network element may store/log each observable parameter network error with its corresponding source and destination zones numbers, and the network element may also log the date/time of measurement. When a subsequent stream of packets is received by the network element, and the subsequent stream of packets has a corresponding source and destination zone, the network element applies the same parameter correction as calculated from the corresponding probe stream.

The exemplary embodiments may be applied to any type of data. The probe streams may have one or more known observable parameters exhibiting characteristics of any type of video data, voice data (such as Voice Over Internet Protocol data), picture data, text data, and all other types of data. In the Voice over Internet Protocol (VoIP) environment, for example, each zone could correspond to a "clump" of proximally-located of VoIP users. These VoIP users should experience similar network performance, and more zones can be added as needed to achieve good results for all VoIP users.

Figure 4:
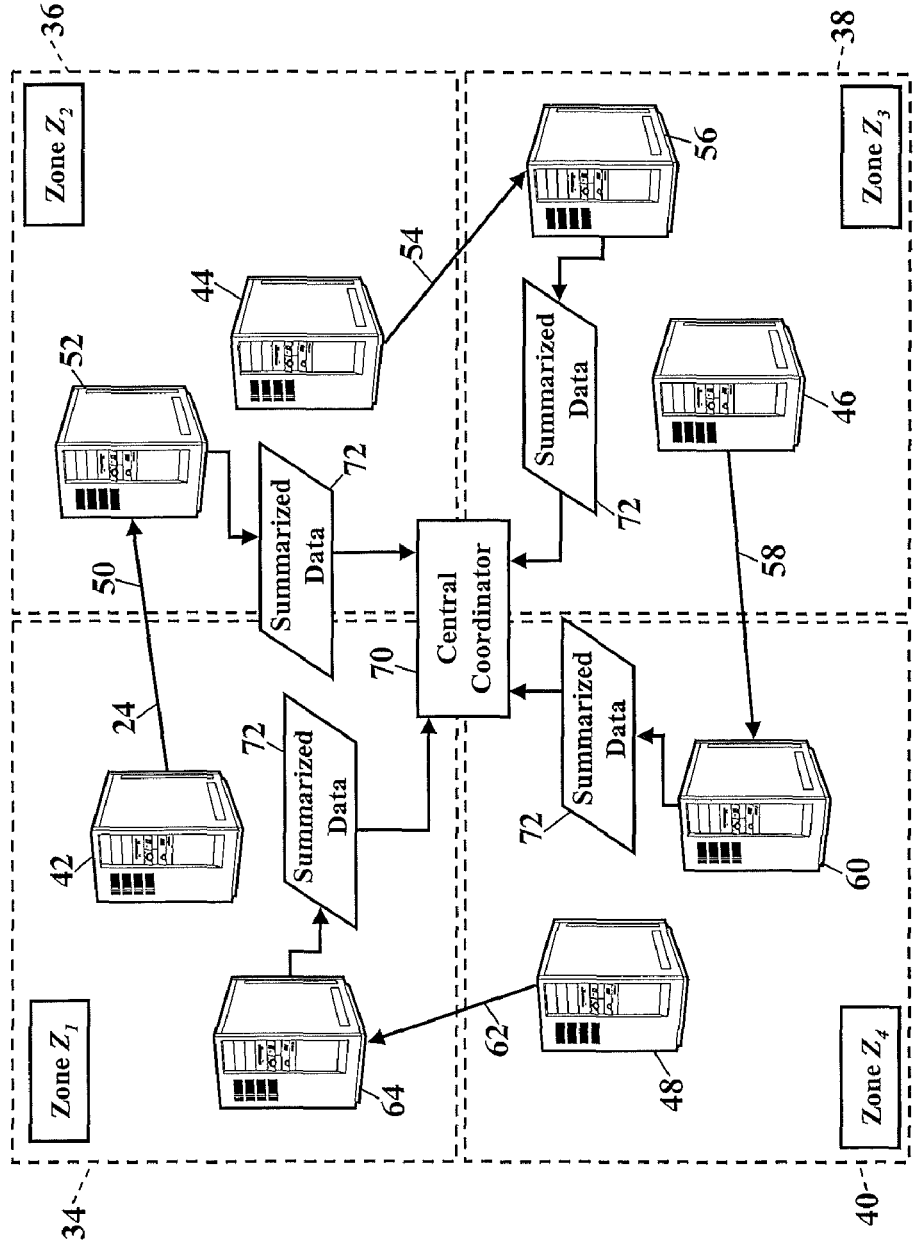
FIG. 4 is a schematic illustrating a central coordinator 70, according to more exemplary embodiments.

FIG. 4 is a schematic illustrating a central coordinator 70, according to more exemplary embodiments. The central coordinator 70 is a computer and/or computer program that receives and analyzes the network-induced variations calculated by the various network elements 52, 56, 60, and 64. Each network element randomly, periodically, and/or sequentially summarizes the calculated network-induced variations and communicates the summarized data 72 to the central coordinator 70. (The central coordinator 70, however, may optionally receive the raw data from each network element.) The summarized data 72 may include, for example, the source zone, the destination zone, the observable parameter, the actual value of the observable parameter, the calculated network-induced variation or error, the date/time of measurement, the identification number, and/or some identification of the network element.

The central coordinator 70 then analyzes the summarized data 72. The central coordinator 70 examines the network-induced variations/errors for problem indications. The central coordinator 70, for example, could determine i) when the rate of change of an error exceeds a threshold, ii) when the actual value of a particular observable parameter error exceeds a parameter-specific threshold, and/or iii) when a particular parameter error or error-change-rate goes out of bounds, i.e., outside an allowed range. The central coordinator 70 could determine when any particular combination or pattern of the above problem indications is pre-configured or designated as suspicious behavior. The central coordinator 70 may check for special patterns, sequences, or time-dependent changes that indicate hacking or an attack on a system.

The central coordinator 70 may also react. When the central coordinator 70 analyzes the summarized data 72, the central coordinator 70 may make decisions and take actions to alleviate situations. The central coordinator 70, for example, may temporarily alter one or more thresholds, values, ranges of values, or any observable parameter, as used in the processing within the central coordinator 70 and/or within one or more of the network elements 52, 56, 60, and 64. The central coordinator 70 may loosen its decision process to account for network problems or tighten its decision process to allow closer monitoring, according to preconfigured rules. The central coordinator 70 may notify one or more network elements by automatically initiating response scripts to partially or fully override errors, for instance if cases of hacking or attack are noted or inferred.

The network elements may also notify the central coordinator 70. A network element 52, 56, 60, and 64, for example, may notify the central coordinator 70 if any error measurement is stale. (To reduce network traffic so as to more provide more effective network utilization, it may be desirable to generate and communicate probe streams and perform the associated error measurements only as often as needed, and the concept of a "stale" measurement can be used to help achieve this goal by providing a means of denoting measurements which are not sufficiently timely.) A stale measurement exceeds some global threshold of time since a last measurement, or the stale measurement exceeds a parameter-specific threshold since a last measurement. A stale measurement may exceed a threshold associated with one or more of a particular observable parameter, a particular source zone, and/or a particular destination zone. The central coordinator 70 may additionally or alternatively independently determine that a measurement is stale, and thus instruct a network element to take measurements. Because the summarized data 72 may include the date/time of a measurement, the central coordinator 70 could autonomously determine when a measurement is stale. The central coordinator 70 could then obtain fresh measurements by autonomously instructing a probe source to issue a probe stream.

When a network element notifies of a stale measurement, the central coordinator 70 may respond. The central coordinator 70, for example, may trigger the launch of a particular probe stream having a particular identification number, thus forcing a fresh measurement of an observable parameter corresponding to the identification number. The central coordinator 70 may also trigger the launch of a set of probe streams to obtain zone-to-zone measurements.

The central coordinator 70 may configure the probe sources (shown as reference numerals 42, 44, 46, and 48 in FIG. 4). The central coordinator 70 may generate the sets of known observable parameters, thus allowing the central coordinator 70 to determine what observable parameters are actually measured. The central coordinator 70 may determine that increasing limited (smaller) sets of parameters should also be generated, thus triggering specific probes and measurements when desired in order to refresh measurements of one or more specific parameter errors. The central coordinator 70 may decide to incorporate one, some, or even all combinations of parameters into corresponding sets, thus tailoring the refreshes to suit network conditions. The central coordinator 70 may assign the identification number to a parameter or set of parameters, and the identification number may be a string of numbers, alphabetic characters, or an alphanumeric string. Each identification number is preferably unique to help avoid confusion.

The central coordinator 70 may also perform updates. Because the central coordinator 70 may generate the sets of parameters, the central coordinator 70, when needed, may update parameter set definitions and the corresponding identification numbers. The updates may be sent to the network elements (shown as reference numerals 52, 56, 60, and 64 in FIG. 4) and/or to the probe sources (shown as reference numerals 42, 44, 46, and 48 in FIG. 4). When the central coordinator 70 performs an update, each update may specify a time period in which any previous parameter set definitions and the corresponding identification numbers may also be used, preferably, however, if there is no overlap between old identification numbers and new identification numbers. Any overlap could potentially cause confusion to the system or to its components.

The central coordinator 70 may also control the zones. The zones $Z_1$, $Z_2$, $Z_3$, and $Z_4$ (shown as respective reference numerals 34, 36, 38, and 40) would initially be configured by a system administrator. One the zones are configured, the central coordinator 70 would then control the zones. During an initial system set-up, the central coordinator 70 may update the network elements (shown as reference numerals 52, 56, 60, and 64) and/or the probe sources (shown as reference numerals 42, 44, 46, and 48) with new zone numbers. The central coordinator 70 may also initially update the network elements with addresses and zone numbers of the corresponding probe sources. The central coordinator 70 may initiate subsequent updates when needed and/or when instructed.

The central coordinator 70 may also establish timers. The central coordinator 70 may assign default timer values to the network elements (shown as reference numerals 52, 56, 60, and 64) and/or to the probe sources (shown as reference numerals 42, 44, 46, and 48). The probe sources may use the timers to control the periodic generation of the probe streams (shown as reference numerals 24, 50, 54, 58, 62, 66, and 68). The network elements may use the timers to determine when the network-induced variation measurements have become stale.

The central coordinator 70 may also deter hackers. The central coordinator 70 may periodically or randomly alter the identification numbers in any way that deters hackers. If the identification numbers periodically or randomly change, the changing identification numbers would be harder to decipher. The central coordinator 70, for example, may randomly or periodically shuffle the identification numbers corresponding to the known observable parameter set definitions. The central coordinator 70 may periodically advance all the identification numbers one or more increments, or vice versa, to deter hacking attempts. The central coordinator 70 could periodically transform the identification numbers to another set of values, in any mathematically possible fashion. All the identification numbers, for example, could be transformed using the same mathematical expression. Some or all of the identification numbers could be transformed using different mathematical expressions. The central coordinator 70 may transform the identification numbers using settable parameters, such as indicating the degree of another aspect of the transformation. However the central coordinator 70 changes the identification numbers, the central coordinator 70 determines a scheme, selects the details of the scheme, and then communicates the details of the scheme to the network elements and/or to the probe sources.

A systems administrator, as earlier mentioned configures the zones. The zones may be chosen according to data types. The zones, for example, may be chosen such that all Voice over Internet Protocol (VoIP) users are included in a zone or set of zones, thus ensuring that all VoIP streams of packets receive compensation for network-induced variation. The systems administrator may also configure the zones such that groups of VoIP users, who interface with the communications network at a same network location, are assigned to the same zone. The zones may also be chosen such that all pertinent network elements are assigned to a zone or set of zones.

The systems administrator may also consider network traffic when configuring the zones. If the communications network is lightly loaded, the zones could be chosen such that some network elements may receive most of the packet traffic, while other network elements receive little or no traffic. The communications module 20, or some other network intelligence, may preferentially route traffic that tends to ignore/bypass a zone and/or a network element. When the communications network becomes heavily loaded, previously ignored network elements may not have fresh correction information and may not be able to correct for current network-induced variation.

Probe streams may be forced when needed. The central coordinator 70, as earlier mentioned, monitors the refresh or timeliness status of error measurements. Each network element (shown as reference numerals 52, 56, 60, and 64) summarizes its network-induced variation measurements and communicates those summaries to the central coordinator 70. The central coordinator 70 looks for patterns of network elements that are being bypassed by the communications network, such that probe streams from a particular zone do not pass through the bypassed network element as often as desired. When some network elements have difficulty obtaining needed probe streams, the central controller may indirectly force the generation of probe streams. The central controller 70 determines the nearest adjacent probe sources (perhaps in an adjacent zone) and adjusts the frequency of generation of probe streams. As more probe streams are generated between the pertinent zone and the nearest, adjacent zone(s), network loading between those zones will increase, resulting in the bypass situation being at least temporarily removed. The central coordinator 70 thus forces the needed probe streams to reach and flow through the previously bypassed network element(s). If the nearest, adjacent zones are not sufficient to force the removal of the bypass condition, more zones may be added, thus generating more probe streams and traffic, until the bypass condition is lifted. Once the desired refresh is obtained in the previously bypassed network element, the central coordinator stops forcing probe streams, so that the communications network overhead (caused by the artificial non-user probe stream traffic) is reduced to the current ambient level. Alternately, well-known source-based and/or policy-based routing could be used to directly force a particular path, allowing a particular network element to receive probe streams so as to conduct the needed measurements. The central coordinator specifies the path of one or more probe streams and translates to source-based or policy-based form. The central coordinator then supplies the formed path to the pertinent probe source(s) and triggers the desired probe stream(s).

Figure 5:
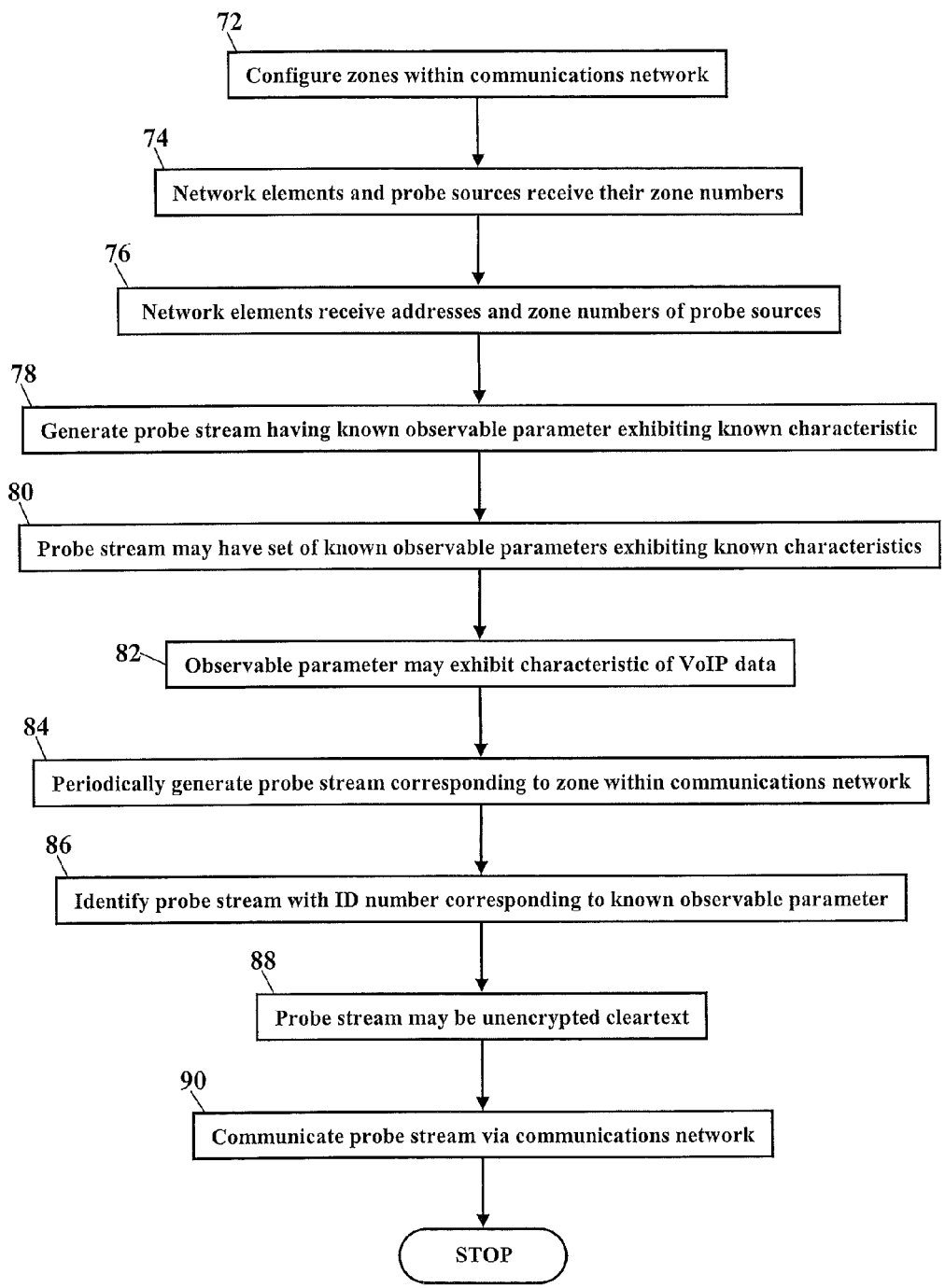
FIG. 5 is a flowchart illustrating a method of detecting encrypted packet streams, according to more exemplary embodiments.

FIG. 5 is a flowchart illustrating a method of detecting encrypted packet streams, according to more exemplary embodiments. A systems administrator configures the zones within the communications network (Block 72). Network elements and probe sources receive their zone numbers (Block 74). The network elements also receive addresses and zone numbers of the probe sources (Block 76). Probe streams are generated stream having a known observable parameter (Block 78). The observable parameter exhibits a known characteristic naturally or artificially associated with a known type of data encrypted within a stream of packets. The probe stream may have a set of known observable parameters exhibiting known characteristics (Block 80). The observable parameter may exhibit a characteristic of Voice over Internet Protocol data encrypted within the stream of packets. The probe stream may be periodically generated corresponding to a zone within a communications network (Block 82). The probe stream may be identified with an identification number corresponding to the known observable parameter (Block 84). The probe stream may be encrypted (Block 86) and/or comprise cleartext data (Block 88). The probe stream is communicated via a communications network (Block 90).

Figure 6:
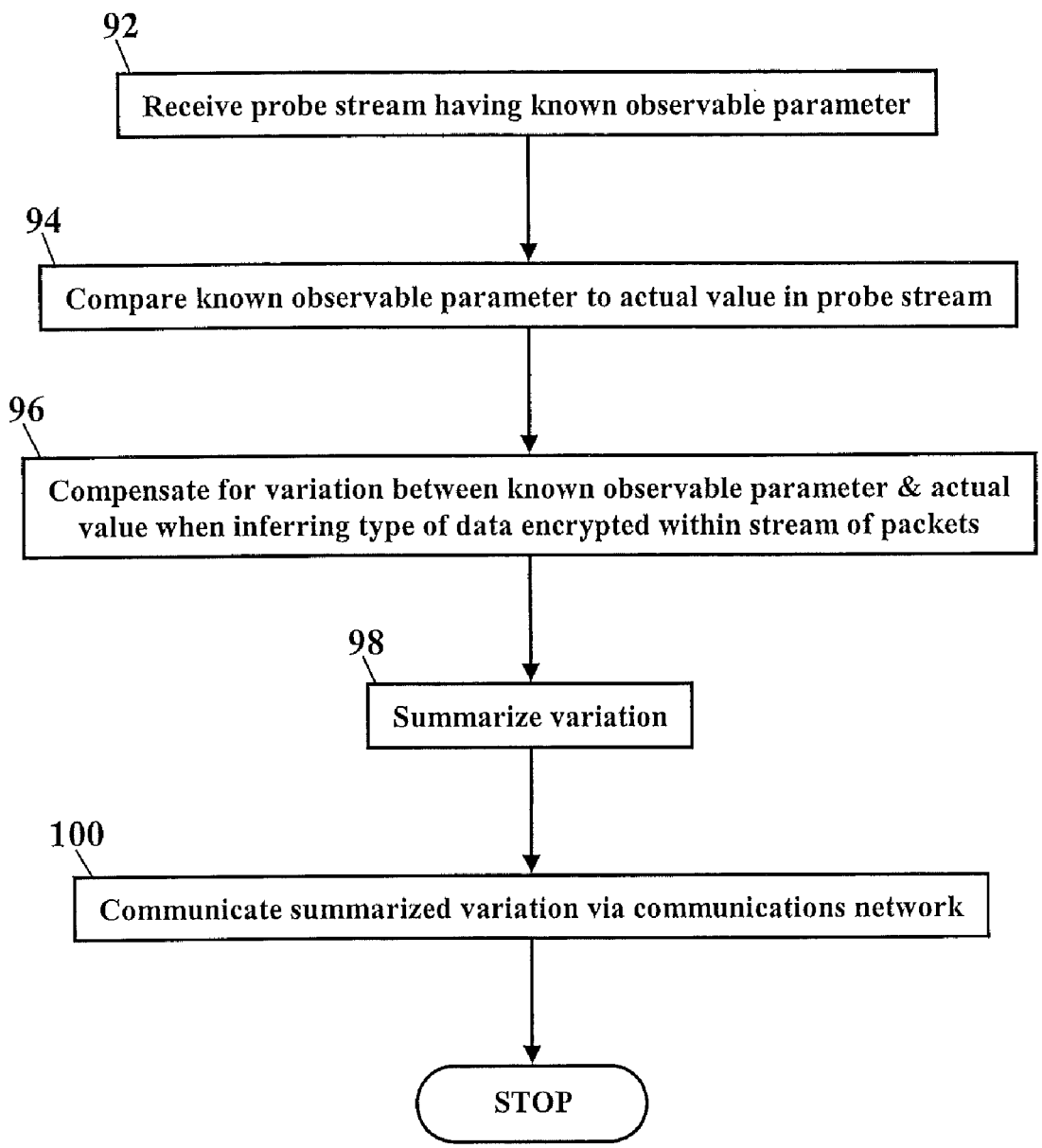
FIG. 6 is a flowchart illustrating another method of detecting encrypted packet streams, according to still more exemplary embodiments.

FIG. 6 is a flowchart illustrating another method of detecting encrypted packet streams, according to still more exemplary embodiments. A probe stream is received, and the probe stream has a known observable parameter (Block 92). The known observable parameter is compared to an actual value in the probe stream (Block 94). Any variation between the known observable parameter and the actual value is compensated when inferring a type of data encrypted within a stream of packets (Block 96). The variation is summarized (Block 98) and communicated via a communications network (Block 100).

The communications module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the communications module to be easily disseminated. A computer program product for detecting the type of data contained within an encrypted stream of packets includes the communications module stored on the computer-readable medium. The communications module includes computer-readable instructions for generating a probe stream having a known observable parameter. The observable parameter exhibits a known characteristic naturally or artificially associated with a known type of data encrypted within a stream of packets. The probe stream is communicated via a communications network.

The communications module may also be physically embodied on or in any addressable (e.g., HTTP, I.E.E.E. 802.11, Wireless Application Protocol (WAP)) wire line or wireless device capable of presenting an IP address. Examples could include a computer, a wireless personal digital assistant (PDA), an Internet Protocol mobile phone, or a wireless pager. The communications module may also be physically embodied on or in any network element through which data traffic flows, is transported, is routed, or is switched. Examples could include a gateway, bridge, router, switch, or firewall.

While the present invention has been described with respect to various features, aspects, and embodiments, those skilled in the art will recognize the invention is not so limited. Other variations, modifications, and alternative embodiments may be made without departing from the spirit and scope of the present invention.

What is claimed is:

1. A method comprising:
   measuring variation in a time interval between probe stream adjacent packets using an inserted known observable parameter as part of a probe stream transmitted via a communications network to determine a network-induced time variation; and
   changing a time interval inserted between subsequent actual data packets transmitted via the communications network based on the network-induced time variation.

2. A method according to claim 1, further comprising:
   periodically generating the probe stream corresponding to a zone within the communications network.

3. A method according to claim 1, further comprising:
   periodically transmitting respective probe streams from different respective zones within the communications network to other zones within the communications network to determine respective zone network-induced time variations.

4. A method according to claim 3 wherein the respective zone network-induced time variations comprise respective zone network-induced time variations corresponding to transmissions from ones of the different respective zones to ones of the other zones.

5. A method according to claim 4 further comprising:
   changing the time interval inserted between subsequent actual data packets transmitted based on the respective zone network-induced time variations corresponding to the transmissions from ones of the different respective zones to ones of the other zones.

6. A system comprising:
   a communications module stored in a memory device, and a processor communicatively coupled to the memory device;
   the communications module to measure variation in a time interval between probe stream adjacent packets using an inserted known observable parameter as part of a probe stream transmitted via a communications network to determine a network-induced time variation; and
   the communications module to change a time interval inserted between subsequent actual data packets transmitted via the communications network based on the network-induced time variation.

7. A system according to claim 6, wherein the communications module is further to generate the probe stream corresponding to a zone within the communications network.

8. A system according to claim 6, wherein the communications module is further to transmit respective probe streams from different respective zones within the communications network to other zones within the communications network to determine respective zone network-induced time variations.

9. A system according to claim 8 wherein the respective zone network-induced time variations comprise respective zone network-induced time variations corresponding to transmissions from ones of the different respective zones to ones of the other zones.

10. A system according to claim 9 wherein the communications module is further to change the time interval inserted between subsequent actual data packets transmitted based on the respective zone network-induced time variations corresponding to the transmissions from ones of the different respective zones to ones of the other zones.

* * * * *